United States Patent [19]

Cannalte et al.

[11] Patent Number: 5,148,449
[45] Date of Patent: Sep. 15, 1992

[54] CENTERING MULTI-LEVEL DATA

[75] Inventors: Gary A. Cannalte, Hoffman Estates; Dennis E. Burke, Elmhurst, both of Ill.

[73] Assignee: Motorola, Inc., Schaumburg, Ill.

[21] Appl. No.: 358,295

[22] Filed: May 26, 1989

[51] Int. Cl.[5] .............................. H04L 25/06
[52] U.S. Cl. ..................... 375/76; 307/264; 328/164
[58] Field of Search ............. 375/76, 99, 110; 307/234, 264, 359, 540; 328/164; 330/137

[56] References Cited

U.S. PATENT DOCUMENTS

| | | | |
|---|---|---|---|
| 4,029,904 | 6/1977 | Papeschi | 375/76 |
| 4,250,458 | 2/1981 | Richmond et al. | 375/99 |
| 4,317,210 | 2/1982 | Dekker et al. | 375/76 |
| 4,459,699 | 7/1984 | Monticelli et al. | 375/76 |
| 4,575,863 | 3/1986 | Butcher et al. | 307/540 |
| 4,625,320 | 11/1986 | Butcher | 307/359 |
| 4,799,042 | 1/1989 | Confalonieri | 341/118 |
| 4,821,292 | 4/1989 | Childress | 375/76 |
| 4,873,702 | 10/1989 | Chiu | 375/76 |
| 4,897,857 | 1/1990 | Wakatsuki et al. | 375/76 |
| 4,910,753 | 3/1990 | Wakatsuki et al. | 375/76 |

Primary Examiner—Stephen Chin
Attorney, Agent, or Firm—F. John Motsinger

[57] ABSTRACT

There is provided a scheme for centering data prior to detection. It comprises: determining carrier frequency error, and pre-adjusting the data detection process to compensate for that error throughout the ensuing data detection. This scheme for reliable multi-level data detection further comprises: upon detection of carrier presence, determining carrier frequency error, gating a voltage associated with the frequency error to the differential amplification process to establish common mode rejection and compensating for that error throughout the ensuing multi-level data detection, and then analog-to-digital conversion of the differentially amplified multi-level data. A scheme for computationally centering the subsequent data detected to compensate for the error is also provided.

20 Claims, 1 Drawing Sheet

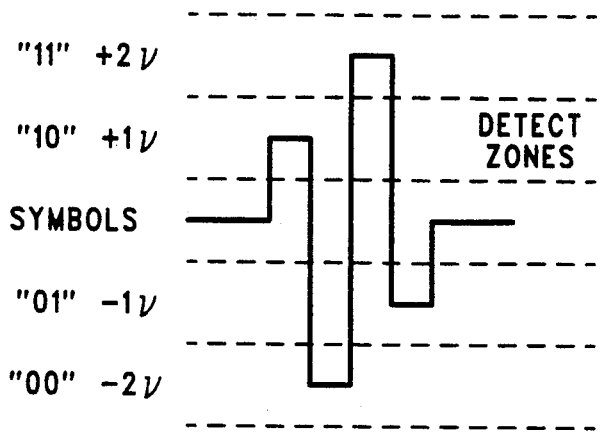
FIG.1
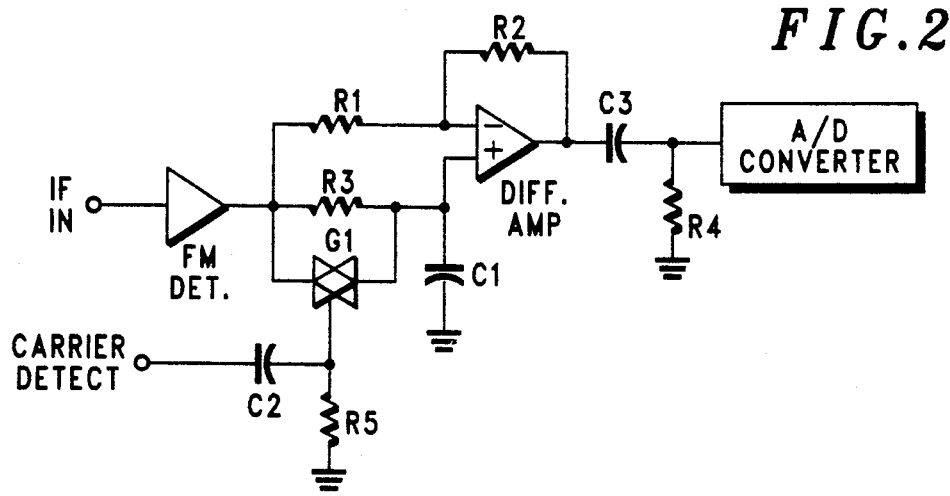
FIG.2
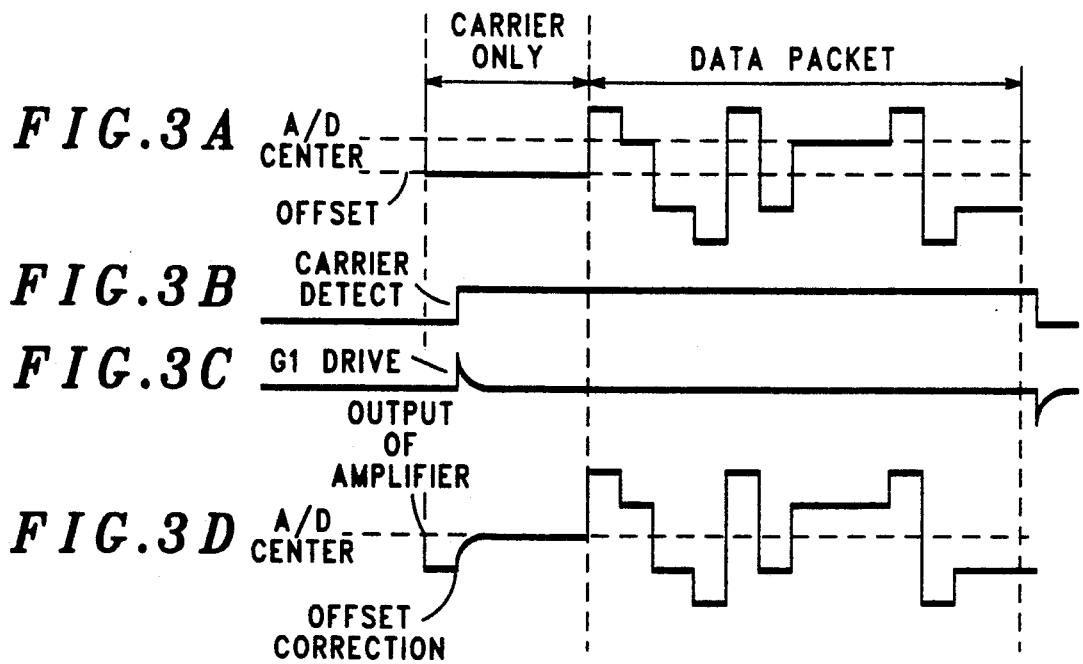

CENTERING MULTI-LEVEL DATA

THE FIELD OF INVENTION

This invention is concerned with centering data prior to detection. More particularly, this invention is concerned with centering packet-switched, multi-level data in narrow band data detectors having frequency offset errors (as would be experienced in radio transmission systems employing Frequency Modulation—FM).

BACKGROUND OF THE INVENTION

Reliable detection of multi-level data in packet switched systems is difficult enough (as detailed below) without the complication of carrier frequency offset errors. The instant invention eliminates the frequency offset complication from the data detection process.

FM receivers often employ automatic frequency control (AFC) to adjust their own center frequency to track the carrier frequency. Standard AFC techniques are far too slow to adapt to the rapidly and ever-changing environment of fast packet switching among a multitude of transmitters, and if made fast enough, would track out the very data of interest, particularly when encountering consecutive identical symbols. Dual time constant AFC techniques (those employing fast attack and normal decay time constants) could be employed, but add considerable expense and complexity.

Television receivers are believed to employ DC restoration techniques that "center" their light-to-dark ratios with reference to maximum-amplitude synchronizing pulses received representing the blackest black; but the present invention requires no such pulses or any reference data whatsoever to "center" its data detector.

The invention then takes as its object to overcome these shortcomings and to realize certain advantages presented below.

SUMMARY OF THE INVENTION

There is provided a scheme for centering data prior to detection. It comprises: determining carrier frequency error, and pre-adjusting the data detection process to compensate for that error throughout the ensuing data detection. This scheme for reliable multi-level data detection further comprises: upon detection of carrier presence, determining carrier frequency error, gating a voltage associated with the frequency error to the differential amplification process to establish common mode rejection and compensating for that error throughout the ensuing multi-level data detection, and then analog-to-digital conversion of the differentially amplified multi-level data. A scheme for computationally centering the subsequent data detected to compensate for the error is also provided.

DESCRIPTION OF THE DRAWINGS

Additional objects, features, and advantages of the invention will be more clearly understood and the best mode contemplated for practicing it in its preferred embodiment will be appreciated (by way of unrestricted example) from the following detailed description, taken together with the accompanying drawings in which:

FIG. 1 is a waveform diagram of the bit value and voltage level of a multi-level data symbol signal.

FIG. 2 is a functional block diagram of the preferred embodiment of a reliable multi-level data symbol detector according to the instant invention.

FIGS. 3A-3D are timing diagrams according to the operation of the instant invention.

DETAILED DESCRIPTION

In systems that employ very high-speed data rates, multi-level data symbols are common since any given symbol takes on a value that would ordinarily require two or more binary bits to convey. However, even without carrier frequency offset errors, multi-level data symbols are more difficult to correctly recover and detect because the detector needs to detect not only the polarity of the symbol (in bipolar pulse systems, as with binary symbols), but also detect the level as well.

FIG. 1 is a waveform diagram of the bit value and voltage level of a multi-level data symbol signal. The multi-level signal of FIG. 1 illustrates five levels representing (arbitrarily) an idle (or noisy) state at 0 volts and one of four possible (dual binary digit) symbol values: "00" at the most negative level (nominally $-2$ volts); "01" at the less negative level (nominally $-1$ volts); "10" at the least positive level (nominally $+2$ volts); and "11" at the most positive level (nominally $+2$ volts). These particular voltage levels are for purposes of illustration only.

Conventionally, this received signal—this multi-level symbol—would be detected by an analog-to-digital converter (A/D), having a voltage detection range roughly centered about the nominal levels—a plurality of A/D's might be employed to obtain many various detection bands and each detection band might be narrowed, as desired.

For proper detection, the voltage level must remain within the detection band centered about each nominal level. Conventional A/D's require that analog information be presented to it centered in its detection range; AC coupling (C3 in FIG. 2) will eliminate gradual, long-term drift (while R4 established the centered reference at common ground potential). However, the entire multi-level signal is ordinarily centered about zero (as in FIG. 1) only when the carrier is exactly on frequency. When the carrier is somewhat off frequency, the symbol levels "ride around" on a DC component produced by most FM data demodulators in proportion to this frequency offset, as illustrated in FIG. 3a. The polarity of this DC component depends upon whether the carrier is above or below the expected carrier frequency. Accordingly, this component of the signal can vary in both magnitude and polarity. This variability makes data detection difficult; the detection would be exacerbated further yet if, for some reason, the data detection bands were to be narrowed.

FIG. 2 is a functional block diagram of the preferred embodiment of a reliable multi-level data detector according to the instant invention. It depicts, coupled in series, an FM detector, differential amplifier and analog-to-digital converter—all well known and understood by those ordinarily skilled in the art.

In our fast packet-switched system, successive data packets of less than 100 $\mu$sec. might be received in rapid succession from totally different transmitters that have not been frequency netted. Thus, the polarity and magnitude of the frequency offset can change radically from packet to packet. System timing is set such that 2 $\mu$sec. of dead time exists between packets; also, the first few $\mu$sec. of each packet is preceded by the unmodulated carrier signal alone.

A transmission of G1 gates a signal from a fast-acting (<1 $\mu$sec.) carrier detection circuit to the differential amplifier through an offset-compensating capacitor C1. The fast-acting (<1 μsec.) carrier detection circuit is not shown, but is well known and understood by those ordinarily skilled in the art.

As can be seen in FIG. 3d, until the offset correction process is started and completed, the offset voltage is amplified, as desired data would be, and presented to the data detector. Depending on the magnitude of the offset voltage, its value can be large enough to fall into one of the acceptance windows of the data detector(s). If so, it will represent erroneous data unless means are provided to ignore this signal. IN practice, most data systems include some type of consistent preamble or header information sent ahead of the actual data information to allow the data detection process to "initialize" itself for proper detection. In effect, no data will be "decoded" correctly after detection by the A/D unless it has been preceded by this preamble or header. The employment of such a signal, at the start of, for example, each data packet in a packet-switched system, will prohibit the data detector from "counting" the initial transient caused by the offset correction process shown in FIG. 3d, since it occurs before the preamble or header signal rather than after it. Absent such a signal in the protocol of the particular system, or even if one is present and utilized, the G1 drive signal shown in FIG. 3c can be employed to momentarily disable the data detector itself, while at the same time enabling the offset correction technique already described. In this manner, the offset correction will have been completed before the data detector is permitted to "count" the initial transient. To implement this technique requires only the short period of unmodulated carrier to be transmitted at the start of each packet, as shown in FIG. 3a, b, c, and d.

In operation, any frequency offset error from the carrier alone (preceding each packet) is presented at the output of the FM detector FM DET. Detection of the carrier makes a transmission gate G1 momentarily conduct; the frequency offset voltage is gated through the transmission gate G1 to the differential amplifier and charges offset-compensating capacitor C1; and then the transmission gate G1 returns to its nonconducting state, as illustrated by the timing diagram of FIGS. 3b and 3c. The time constant obtained by the product of R3 and C1 is chosen to be very long compared to the overall length of the packet and the time length of any particular symbol. Thus, throughout the data detection process, the frequency offset voltage (that the data rides on, FIG. 3a) and the frequency offset voltage (in the carrier alone, that has been stored on C1) are applied to the minus and plus terminals of the differential amplifier DIFF AMP respectively, resulting in "common mode rejection" of the frequency offset error (assumed to have been substantially constant throughout the packet). Accordingly, the data reproduced from the differential mode of the differential amplifier DIFF AMP is now substantially centered about zero (as illustrated in FIG. 3d) and presented for digitization in the analog-to-digital converter A/D via drift-compensating components C3 and R4. It should be noticed that the data signals, which comprise the packet of information, can be and typically are, amplified by the DIFF AMP. The amount of gain is determined by the ratio of R2 divided by R1. This ratio can be any value within the "raw" gain capability of the DIFF AMP employed, at the data rate of interest. Conversely, the voltage component caused by frequency offset of the carrier, which is now the same on both inputs to the DIFF AMP, has become a "common mode" component which is subject to the same gain, but since it is the same on both inputs, results in no "difference" to amplify. This entire process is repeated upon the loss of carrier and the arrival of another packet.

Alternatively, upon detection of carrier presence, the carrier alone could be digitized in the analog-to-digital converter A/D and noted for computational netting (subtraction) from subsequently digitized data. Carrier presence could be detected from either the fast carrier detector (not illustrated) or detected computationally from the presence of substantially quiescent data of a known duration (a few μsec.). Then, the subsequent data would be digitized in the A/D and stored in memory; that noted level associated with the carrier offset frequency, could be netted from the level of the data detected to computationally "center" the data. The netting could also be performed real time with sufficient processing capability; then, the level associated with the carrier offset frequency could be netted from the data symbol level detected in the A/D on a sample-by-sample basis.

In summary then, there has been provided a scheme for centering data prior to detection. It comprises: determining carrier frequency error, and pre-adjusting the data detection process to compensate for that error throughout the ensuing data detection. This scheme for reliable multi-level data detection further comprises: upon detection of carrier presence, determining carrier frequency error, gating a voltage associated with the frequency error to the differential amplification process to establish common mode rejection and compensating for that error throughout the ensuing multi-level data detection, and then analog-to-digital conversion of the differentially amplified multi-level data. A scheme for computationally centering the subsequent data detected to compensate for the error has also been provided.

While the preferred embodiment of the invention has been described and shown, it will be appreciated by those skilled in the art that other variations and modifications of this invention may be implemented. For example, as shown in FIG. 3c, the G1 drive signal results from differentiation of the carrier Detect signal shown in FIG. 3b. In order for this signal to be effective for the application, namely to cause G1 to conduct for a short and relatively fixed period of time, the leading edge of the Carrier Detect signal must have a predictable rise time. It must be the same whether the incoming carrier is barely adequate to activate the carrier detector or many orders of magnitude larger. In the preferred embodiment described, a carrier detector meeting this requirement exists, and such performance is assumed. However, there can certainly be applications for this invention where the carrier detector would not meet this requirement. For such practices of this invention, a means to provide such a predictable waveform to G1 would be required. This is easily done via well-established art. For example, a monostable multivibrator, which is well known in the art, can be employed between the G1 Drive signal which appears at the junction of C2 and R5 in FIG. 2, and the input of gate G1. In this manner, the Carrier Detect signal is merely used to "trigger" the monostable multivibrator to its unstable state. The monostable would then supply G1 with its drive signal, the duration of which would be predictable under all conditions as previously mentioned, and determined by the designer to suit the particular application.

Such established means might also be employed, for example, if the data packets are very long, i.e. seconds or more. In such cases, the value of C1, which stores the offset voltage level as previously described, must be quite large in order to hold this charge during the entire data packet, and also not change as a result of the data signal itself, which may contain long strings of identical data levels. Under such conditions, the time constant product of R3 and C1 must be very long. For maximum DIFF AMP stability, the values of R3 and R1 are identical, and since R1 is a factor in the DIFF AMP gain equation as previously mentioned, the designer is left with only the value of C1 to adjust to obtain the long time constant. If C1 is made very large, then the low, but finite "on" resistance of G1, as well as the source resistance of the FM detector can become a factor in the charging of it. In such cases, again the employment of a monostable multivibrator between the junction of C2 and R5 and gate G1 provides an adequate solution. G1 may be kept activated for longer periods of time in this manner, providing more time for C1 to charge. The system designer might also extend the Carrier Only portion of the data itself to provide additional time to charge the now larger value of C1. While this might seem to slow the data throughput in the system, since the data packets are much longer in this example, the ratio of carrier only to data time need not change.

These and all other variations and adaptations are expected to fall within the ambit of the appended claims.

What we claim and desire to secure by Letters Patents is:

1. A method of centering data for data detection comprising:
   determining unmodulated carrier frequency error, and
   pre-adjusting the data detection process to compensate for that error throughout the ensuing data detection.

2. A method as claimed in claim 1, wherein data detection comprises: differential amplification.

3. A method as claimed in claim 2, wherein error determination and pre-adjustment comprises: establishing common mode rejection of the voltage offset associated with the frequency error in the subsequent differential amplification.

4. A method as claimed in claim 3, wherein the pre-adjustment of common mode rejection comprises: gating a voltage associated with the frequency error to the differential amplification upon detection of unmodulated carrier presence.

5. A method as claimed in claim 1, wherein data detection further comprises: analog-to-digital conversion.

6. A method as claimed in claim 1, wherein the data comprises multi-level data.

7. A method of centering data for data detection comprising:
   determining unmodulated carrier frequency error, and
   establishing common mode rejection of the voltage offset associated with the frequency error in the subsequent differential amplification to compensate for that error throughout the ensuing data detection.

8. A method of centering multi-level data for data detection comprising:
   determining unmodulated carrier frequency error, gating a voltage associated with the frequency error to the differential amplification upon detection of unmodulated carrier presence to establish common mode rejection of the voltage offset associated with the frequency error in the subsequent differential amplification to compensate for that error throughout the ensuing multi-level data detection, and
   analog-to-digital conversion of the differentially amplified multi-level data.

9. A method of centering data for data detection comprising:
   determining carrier frequency error, and
   computationally centering the subsequent data detected to compensate for the error.

10. A method as claimed in claim 9, wherein the level of the carrier alone is netted from the data subsequently detected.

11. A method as claimed in claim 9, wherein the level of the carrier alone is noted upon detection of carrier presence.

12. A method as claimed in claim 9, wherein carrier presence is detected upon substantially quiescent data.

13. A method as claimed in claim 9, wherein carrier presence is detected upon substantially quiescent data of known duration.

14. A method of centering data for data detection comprising:
   determining carrier frequency error, and
   netting the level of the carrier detected from the data subsequently detected to compensate for the error.

15. A method of centering data for data detection comprising:
   determining unmodulated carrier frequency error, and
   netting the level of the carrier noted upon detection of carrier presence from the data subsequently detected to compensate for the error.

16. A method of centering data for data detection comprising:
   determining unmodulated carrier frequency error, and
   netting the frequency error of the carrier alone, noted upon substantially quiescent data of known duration, from the data subsequently detected to compensate for the error.

17. A data centerer for data detectors comprising:
   means for determining unmodulated carrier frequency error, and
   means for pre-adjusting the data detection process to compensate for that error throughout the ensuing data detection.

18. A data centerer for data detectors comprising:
   means for determining unmodulated carrier frequency error, and
   means for establishing common mode rejection of the voltage offset associated with the frequency error in the subsequent differential amplification to compensate for that error throughout the ensuing data detection.

19. A multi-level data centerer for data detections comprising, coupled in series:
   means for determining unmodulated carrier frequency error,
   means for gating a voltage associated with the frequency error to the differential amplification upon detection of unmodulated carrier presence to establish common mode rejection of the frequency error in the subsequent differential amplification to compensate for that error throughout the ensuing multi-level data detection, and means for analog-to-digital conversion of the differentially amplified multi-level data.

20. A data centerer comprising:
means for determining carrier frequency error, and
means for computationally centering the subsequent data detected to compensate for the error.

* * * * *